United States Patent [19]

Dohne et al.

[11] 3,806,647

[45] Apr. 23, 1974

[54] PHASE AMBIGUITY RESOLUTION SYSTEM USING CONVOLUTIONAL CODING-THRESHOLD DECODING

[75] Inventors: Alan Swaine Dohne, Gaithersburg; Eugene Richard Cacciamani, Jr., Rockville, both of Md.

[73] Assignee: Communications Satellite Corporation, Washington, D.C.

[22] Filed: July 28, 1972

[21] Appl. No.: 276,003

[52] U.S. Cl. .................... 178/67, 325/41, 340/146.1

[51] Int. Cl. ............................................ H04l 27/24

[58] Field of Search ................. 325/41, 60, 30, 320; 178/67; 179/15 AE, 15 BC, 15 BS; 340/146.1 AQ, 146.1 AG, 146.1 D

[56] References Cited

UNITED STATES PATENTS 3,665,396 5/1972 Forney ...................... 340/146.1 AQ

*Primary Examiner*—Albert J. Mayer

*Attorney, Agent, or Firm*—Sughrue, Rothwell, Mion, Zinn & Macpeak

[57] ABSTRACT

A synchronizer in the receive side of a digital communication system is inserted between the output of a PSK demodulator and the input of a threshold decoder of the type which can correct a predetermined number of bit errors in a convolutionally encoded bit stream. The synchronizer responds to error indicating pulses from the threshold decoder to alter the demodulated data by making the necessary corrections to resolve phase ambiguity and to achieve node synchronization. There are only a finite number of types of errors caused by phase ambiguity and improper node synchronization. The synchronizer includes a memory counter which has at least as many states as the number of all possible combinations of said types of errors. Each state of the memory counter controls correction of a different combination of said types of errors, so that there always exists one state of the memory counter which will make all the corrections needed to resolve phase ambiguity and achieve node synchronization. The memory counter is advanced by search pulses which are generated in the synchronizer by an error rate detector whenever the error indicating pulses from the threshold decoder are sufficiently numerous to indicate a gross error in the bit stream applied to the threshold decoder. As the search pulses continue to advance the memory counter through its states, it will eventually reach the state which makes all needed corrections. At that time there will no longer be a gross error in the bit stream applied to the threshold decoder, the search pulses will no longer be generated, and the memory counter will remain in the state which provides all needed corrections.

12 Claims, 11 Drawing Figures

PHASE AMBIGUITY RESOLUTION SYSTEM USING CONVOLUTIONAL CODING-THRESHOLD DECODING

BACKGROUND OF THE INVENTION

The invention is in the field of digital communications, and more particularly, is a system which operates to solve the phase ambiguity problem which may occur in a PSK (phase shift keying) modulation system and to solve the node synchronization problem which may occur when using convolutional coding and threshold decoding for error correcting purposes.

In systems which transmit digital data over long distance, for example, via an Earth orbiting satellite, errors may occur due to various reasons thereby affecting the reliability of the communicated information. In order to maintain the error rate at a tolerably low level, error detecting and correcting schemes are used. One general type of error detecting and correcting method is known as systematic convolutional encoding with threshold decoding. Such methods and apparatus are well known in the art and operate generally in the following manner. At the transmit end the information bits are applied to a rate $n/m$ systematic convolutional encoder. For every n bits into the encoder, the encoder generates $m-n$ parity or redundant bits and provides at its output a total of $m$ bits, including $n$ data bits and $m-n$ parity bits. Note, $m$ is greater than $n$. On the receive side, each group of m bits is separated into its n data bit components and its $m-n$ parity bits. The $n$ data bits are applied to an encoder which is identical to the encoder at the transmission side, thereby resulting in receive-side locally generated $m-n$ parity bits. If there is no error in the data transmission, the locally generated $m-n$ parity bits will be identical to the received $m-n$ parity bits, the latter having been generated on the transmit side. The received and locally generated parity bits are applied to a mod 2 adder whose output represents error indications. The error indications, otherwise known as syndromes, are applied to a syndrome register which has selected outputs therefrom connected to a threshold detector. The threshold detector responds to the contents of the syndrome register to provide an output bit, referred to as a correction bit, which is then used to correct the received data bits. The details of such systems are well known and will not be discussed further herein. However, it should be noted that the setting of the threshold detector is dependent upon the rate of the convolutional encoder and it can correct a predetermined number of errors in the data sequence.

Since it is necessary to apply the received n data bits to an identical encoder at the receiver and to compare the locally generated parity bits with the received parity bits, it is apparent that for each $m$ bits received some means must be provided for detecting the beginning of each group of m bits so that the $n$ data bits can be separated from the $m-n$ parity bits. This problem is referred to as the problem of node synchronization. One prior technique for accomplishing node synchronization included the periodic transmission of unique words which are detected at the receiver. Stated very simply, once the unique word was detected, the receive system is thereby made aware that the first bit following the unique word is the start of a group of $m$ bits. With this information, this system is then capable of separating out the first $n$ of these $m$ bits and applying them to the data input of the receive side convolutional encoder and separating out the last $m-n$ parity bits of the group of $m$ bits and applying them to the mode 2 adder.

Although the use of unique words may be satisfactory for many purposes, it has the deficiency of increasing the number of non-information bits in the total data stream thereby decreasing the information bit rate of the overall system, or conversely, increasing the bandwidth necessary to transmit a given amount of information.

Another conventional technique used in the transmission of digital data is that of PSK modulation. Two phase PSK modulation and four phase PSK modulation have received the most attention although eight phase, sixteen phase, etc. PSK modulation are also possible. PSK modulation, as is well known, is not primarily concerned with error detection and correction but is simply a highly useful method of modulating the digital information onto the RF carrier. In two phase PSK modulation, for example, each zero bit might cause the carrier to be transmitted at its zero or reference phase whereas each one bit may cause the carrier to be transmitted 180° out of phase with the reference phase of the carrier. The four phase PSK modulation is essentially similar to two phase PSK modulation except four phases of the carrier are used. The four phases are the zero degree phase, the 90° phase, the 180° phase, and the 270° phase. The use of four phases essentially allows the transmission of twice as much information for a given symbol rate. In four phase PSK the bits to be transmitted are divided into two channels, commonly referred to as the A and B channels. As is apparent, the possible combination of simultaneously appearing bits on the A and B channels are 00, 01, 10 and 11. Each of these four possibilities causes the carrier to be transmitted in one of the four respective phases referred to above.

One of the problems inherent in using PSK systems is that of phase ambiguity. Briefly, this is the problem of identifying the proper reference phase at the receiver. Since the receiver does not receive a pilot signal corresponding to the reference phase, but merely receives the carrier in one of its various phases, without a phase ambiguity resolver the receiver has no way of knowing which of the received phases corresponds to the reference phase. This problem of phase ambiguity has received much attention in the prior art. In a two phase PSK system, there is only one possible ambiguity, and thus the recovered carrier will either be at the proper reference phase or 180° out of phase with the proper reference phase. If the recovered carrier is in the proper phase, then the demodulated data will be a correct representation of the transmitted data. However, if the recovered carrier is 180° out of phase with the proper phase, the demodulated data will be an inverted representation of the transmitted data.

In a four phase PSK system, the ambiguity problem is greater. There are eight possibilities of errors caused by the recovered carrier being at the wrong phase and also caused by polarity inversion in the transmission medium. The demodulator output of the four phase PSK system should have two channels, channels A and B, of output data corresponding to the transmitted channels A and B. The possible errors are any combination of the following:

Channel A — inverted

Channel B — inverted

Channels A and B — switched or reversed

As will be appreciated, these three individual types of errors combine to form a possibility of eight different output variations, only one of which can be correct. That being the channel A output containing the true channel A data and the channel B output containing the true channel B data.

A number of techniques for solving the phase ambiguity problem are known in the prior art. One particular technique for solving the problem with four phase or multiple phase PSK systems is described and claimed in U.S. Pat. application, Ser. No. 173,191, entitled "Phase Ambiguity Resolution for Four Phase PSK Communications Systems" by Wolejsza et al., filed Aug. 19, 1971, and assigned to the assignee herein. In the system of the latter application, a scheme of periodically transmitted unique words is used to correct phase ambiguity. One unique word is included in the A channel at the transmitter and another unique word is included in the B channel at the transmitter. If there is no phase ambiguity, these same unique words will appear on the respective A and B channel outputs of the receiver demodulator. However, if there is an ambiguity, the unique words will not appear in the proper form at the receiver demodulator outputs.

As in the case with error correcting, the use of unique words adds an additional number of non-information bits to the total bit stream thereby decreasing the information bit rate or conversely increasing the bandwidth necessary to transmit a given amount of information.

SUMMARY OF THE INVENTION

In accordance with the present invention, a synchronization system is provided for a digital communications system which uses PSK modulation and which also uses convolutional encoding-threshold decoding for error correcting. The particular synchronization system eliminates the need for unique words and performs both node synchronization and phase ambiguity resolution without adding any additional bits to the bit stream.

The synchronization system is included in the receiver and operates in response to error indicating bits from the convolutional decoder. Since both the syndrome bits and the correction bits provide indications of error, either may be used. However, for the purpose of describing a preferred embodiment of the invention, the correction bits out of the threshold detectors are used in the synchronization system to be described more fully herein.

The synchronization system examines the correction bits over a given period of time, known as a frame. If the number of correction bits during a frame exceeds the number which would normally occur if the system was operating correctly without phase ambiguity and without incorrect node synchronization, the synchronization system assumes that there is a problem caused either by phase ambiguity or node synchronization. Each time this occurs the synchronization system changes to a different one of its states, each state controlling one or more of the possible phase ambiguity errors or controlling bit delay means to find proper node synchronization. The synchronization system is thus moved successively through each of its controlling states until the number of correction bits applied thereto within one frame period decreases to a level which is indicative of proper node synchronization and proper phase resolution.

DETAILED DESCRIPTION OF THE DRAWINGS

To provide an understanding of the generic features of the present invention, three different cases will be described in detail. The first case will be for a system which uses a rate one-half convolutional encoder and uses four phase PSK modulation, the second is for a system which uses a rate three-fourths convolutional encoder with two phase PSK modulation, and the third is for a system that uses a rate three-fourths convolutional encoder with four phase PSK modulation.

Figure 1:
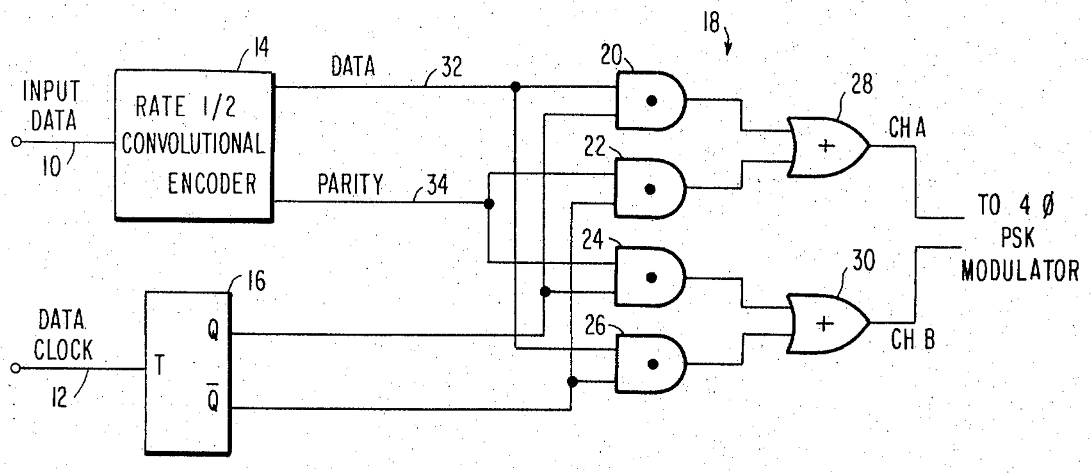
FIG. 1 is a block diagram of the transmit side of a system using a rate one-half convolutional encoder and a two phase PSK modulator.
Figure 1A:
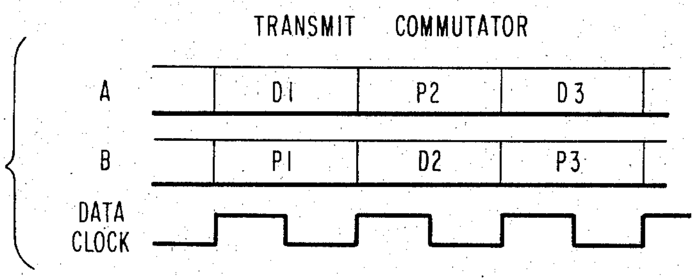
FIG. 1A is a timing diagram representing the timing of bits at various stages of the system of FIG. 1.

Referring to FIG. 1 there is shown the transmit side of the system using the rate one-half convolutional encoder with four phase PSK modulation. As will be appreciated by anyone of ordinary skill in the art, only those elements necessary for an understanding of the invention are disclosed and discussed in detail herein. The other conventional elements forming a part of a digital communications system such as the transmitter, the modulator, the demodulator, etc., are not shown herein. As shown in FIG. 1, the input data appearing on line 10 is applied to a rate one-half convolutional encoder 14. Also, in time with the input data, the data clock appears on line 12 and is applied to a flip flop 16. As is well known, a rate one-half convolutional encoder provides two output bits for each data bit input. The two output bits appear respectively on the data output line 32 and the parity line 34. For reasons which will be described more fully hereafter, in the particular case of one-half convolutional encoder with four phase PSK modulation, it is necessary to commutate the data and parity bits onto the channel A and B lines which feed into the four phase PSK modulator. For this purpose, a commutator 18 receives the data and parity bits in response to the control signals from flip flop 16. The functional operation of the commutator is illustated in FIG. 1A. In the latter figure, $D_1$ represents the first data bit, $P_1$ represents the first parity bit, $D_2$ represents the second data bit, and $P_2$ represents the second parity bit, etc. As can be seen from the latter figure, the first data bit is transferred to channel A and the first parity bit is transferred to channel B. The second data bit is transferred to channel B and the second parity bit is transferred to channel A. This commutation continues throughout the entire transmission period. The commutator 18 comprises AND gates 20, 22, 24 and 26 and OR gates 28 and 30. When the Q output of flip flop 16 is true, AND gates 20 and 24 are energized to transfer the data and parity bits through OR gates 28 and 30 to channels A and B, respectively. When $\overline{Q}$ is true, AND gates 22 and 26 are energized to transfer the data and parity bits to channels B and A, respectively. The A and B channels modulate the carrier in a conventional four phase PSK modulator and the resultant RF carrier with modulation is transmitted to the receiver.

Figure 2:
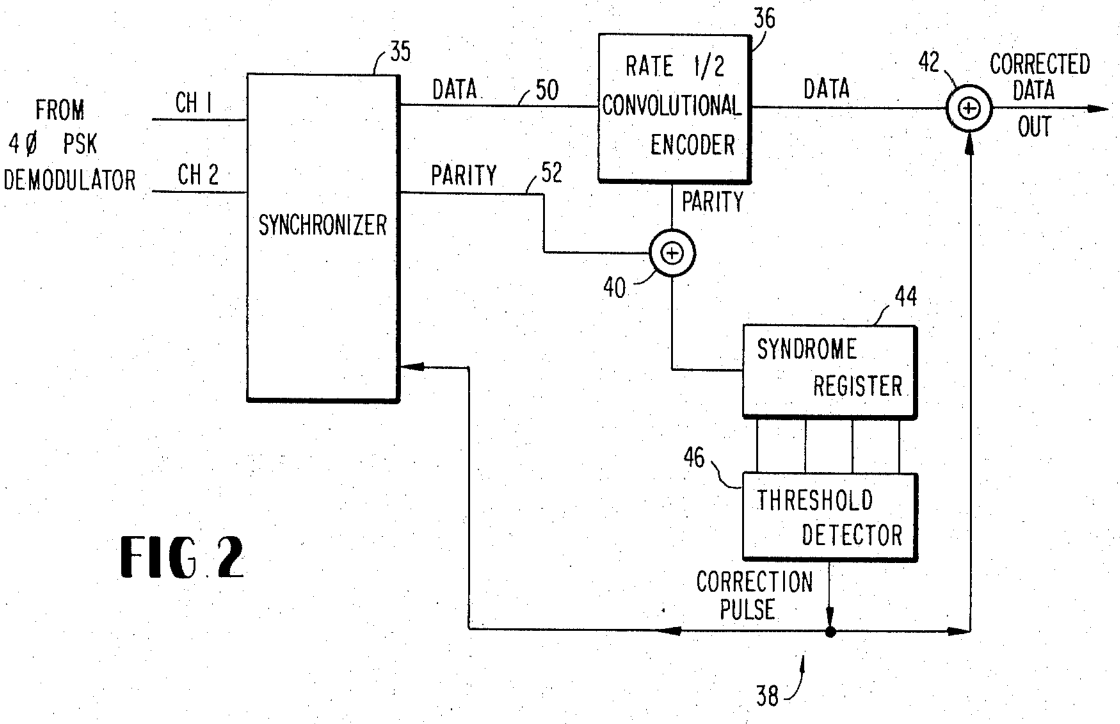
FIG. 2 is a block diagram of a portion of the receiver adapted to receive signals from the transmitter of FIG. 1.

A general block diagram of the receiver for the rate one-half convolutional encoder with four phase PSK modulation is illustrated in FIG. 2. The received modulated carrier is applied to a conventional four phase PSK demodulator (not shown) resulting in two output channels, referred to as channels 1 and 2. If there is no error in the phase resolution, channel 1 data will correspond to the transmitted channel A data, with some possible transmission errors, and the channel 2 data will correspond to the transmitted channel B data, with some possible transmission errors. The channel 1 and channel 2 bits are applied to a synchronizer 36, and if there is no phase resolution error, the synchronizer will simply decommutate the bits on channels 1 and 2 and provide the data and parity bits on output lines 50 and 52. The data and parity bits are then applied to the error correcting threshold decoder 38 which comprises, a rate one-half convolutional encoder 36, a pair of mod 2 adders 40 and 42, a syndrome register 44, and a threshold detector 46. The convolutional encoder 36 is identical to the convolutional encoder 14 shown in FIG. 1. For each data input bit into the encoder 36 the latter device provides two output bits corresponding respectively to the input data bit and a parity bit. The parity bit, which is referred to as the receive side locally generated parity, is applied as one input to the mod 2 adder 40. The received parity bits on line 52 are applied to the other input of the mod 2 adder 40. The data output bits from the encoder 36 are applied as one input to the mod 2 adder 42. For every locally generated parity bit which does not correspond to the received parity bits, the mod 2 adder 40 will provide an output bit to the syndrome register 44. For a given pattern of syndrome bits in the register 44, the threshold detector 36 will provide an output correction pulse which conventionally is applied to the mod 2 adder 42 to correct the data thereby resulting in a corrected data output. In accordance with the present invention, the correction pulse output from threshold detector 46 is also used to resolve the phase ambiguity and node synchronization problems. As stated above, in a four phase PSK system the phase ambiguity can result in inversion or switching of the channels. Thus, channel 1 may correspond to channel A, channel A inverted, channel B or channel B inverted. Channel 2 bits may correspond to channel B, channel B inverted, channel A or channel A inverted.

In the absence of the synchronizer 36, the aforementioned problem of the inverted or switched channel A or channel B data appearing on channels 1 and 2 would be transferred to the input lines 50 and 52 which are applied to the threshold decoder. The erroneous situations which would occur include the data being on line 50 but being inverted, the parity being on line 52, but being inverted, the data and parity appearing on lines 52 and 50 respectively, i.e., switched, the data and parity switched and either one or both being inverted. Under any of the conditions mentioned except for the proper condition, i.e., true data appearing on line 50 and true parity appearing on line 52, the number of syndrome bits into the syndrome register 44 and concomitantly the number of correction pulses out of the threshold detector 46 will greatly exceed the normal probability error rate for the system. The synchronizer is adapted to detect this condition and change a memory counter therein to cause one or more of the following correction actions to take place. In one state of the memory counter, the synchronizer will switch channels 1 and 2. In another state of the memory counter, the synchronizer will invert channel 1. In another state of the memory counter the synchronizer will invert channel 2, etc. Thus, as long as the correction pulses occur at a rate which indicates that the error greatly exceeds the probability of the system error rate, the synchronizer memory counter will change states until the right combination of corrections is reached to place the true data on line 50 and the true parity on line 52.

The purpose of commutating channels A and B at the transmitter and correspondingly decommutating channels 1 and 2 at the receiver, will now be described. As stated previously, one of the possible errors due to phase ambiguity results in the bits on one line being inverted. For example, without commutation this could result in the data appearing in inverted form on line 50 with the parity appearing in true form on line 52. However, due to the nature of certain convolutional encoders, the fact that the data is inverted would not be detected because the convolutional encoder will generate the identical parity whether the data is true or inverted. Thus, it is important in the particular case described for FIGS. 1 and 2 that the condition of inverted data on line 50 and true parity on line 52 not be allowed to occur. The occurrence of the latter condition is prevented by commutation. Since channel A, due to commutation, includes both data and parity, and also channel B, due to commutation, contains both data and parity, inversion of only one of the channels will ensure that some parity as well as some of the data is inverted. Consequently, it is impossible to end up with inverted data on line 50 and true parity on line 52.

Figure 3:
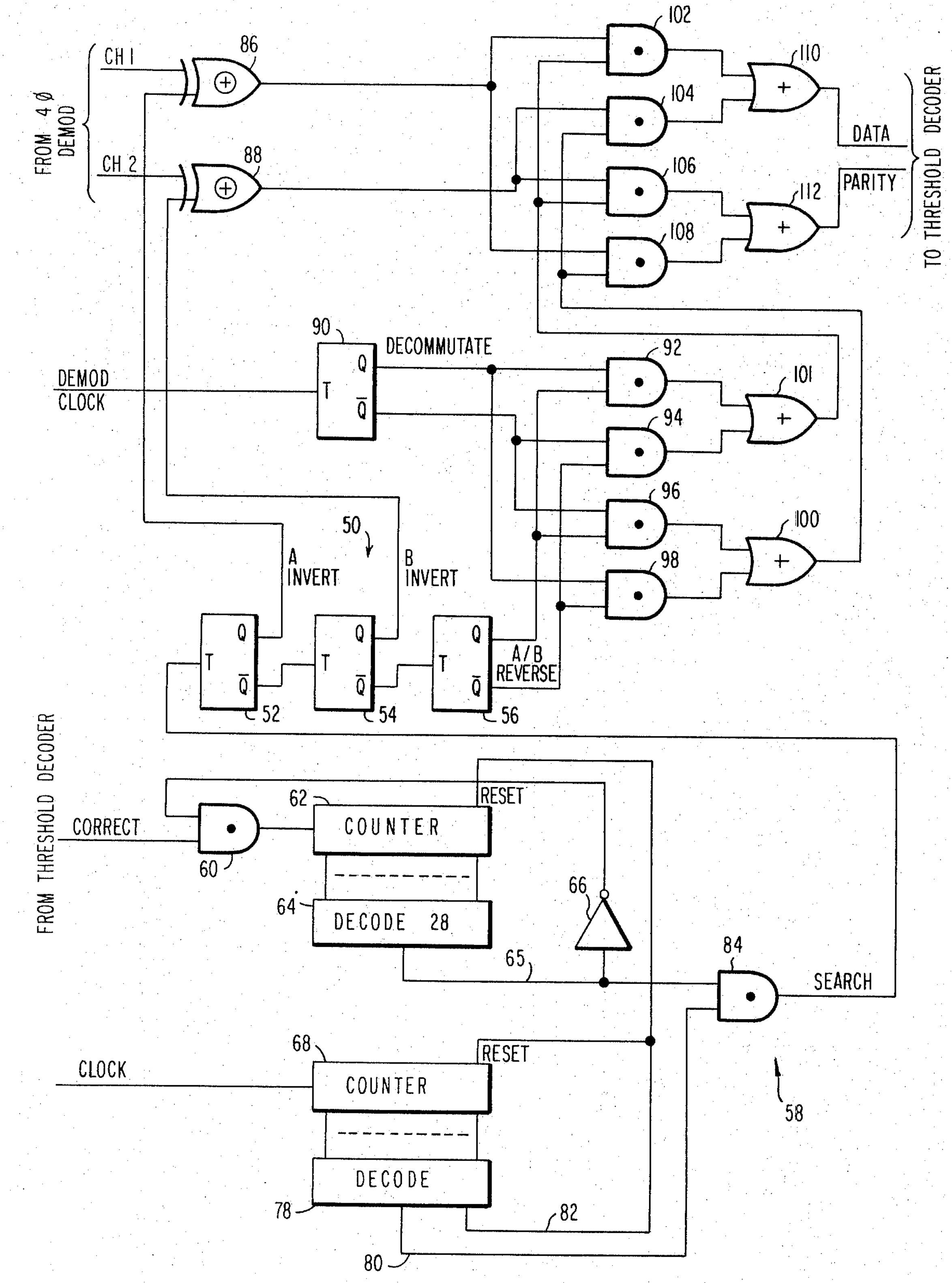
FIG. 3 is a detailed block diagram of the synchronizer shown generally in FIG. 2.

A detailed block diagram of the synchronizer 36 is illustrated in FIG. 3. The synchronizer includes a memory state counter 50 comprising three flip flop stages 52, 54 and 56. The memory state counter has eight states from 000 to 111. The counter 50 is advanced by a search pulse appearing at the output of AND gate 84. AND gate 84 is part of the error rate detector 58. The latter device generates a search pulse whenever the rate of occurrence of the correction pulses is great enough to indicate that true data and true parity do not appear on the correct input lines to the threshold decoder. For the specific case illustrated, the error rate detector 58 generates a search pulse if it receives 28 or more correction pulses in a single correction frame.

The correction frame is 384 clock bits in length. For those parameters mentioned, the probability of the search pulse occurring when the system is properly synchronized is 0.87 times $10^{-15}$. Stated generally, this figure means that it is practically impossible for a search pulse to occur if the system is properly synchronized with true data and true parity appearing on the proper inputs to the threshold decoders. On the other hand, when the system is not properly synchronized, the probability of getting a search pulse is 0.96. Stated generally, this figure means that if the system is not properly synchronized it is almost certain that a search pulse will be generated.

The error rate detector includes AND gates 60 and 84, invert gate 66, counters 62 and 68, and decoders 64 and 78. The counter 68 and decoder 78 determine the frame time. The counter 68 receives the recovered clock pulses which occur in time with the recovered data. A conventional decoder 78 provides an output pulse whenever the decoder reaches a count of 384. The latter output pulse appears on output line 80 and is applied as one input to AND gate 84. When counter 68 reaches a count of 385, an output pulse appears on line 82 and operates to reset counters 68 and 62 to zero thereby beginning a new frame. The correction pulse counter 62 receives the correction pulses from the threshold detector via normally energized AND gate 60. As soon as correction counter 62 reaches a count of 28, the decoder 64 provides an output pulse on output line 65. The output pulse on line 65 is applied to invert gate 66 thereby deenergizing AND gate 60 and preventing the counter 62 from counting higher than 28. Since the counter 62 holds the count of 28, the high level pulse will remain on output line 65 until counter 62 is reset. The high level pulse on line 65 also energizes AND gate 84. As can be seen from the logic just described, if the correction counter 62 reaches a count of 28 before the clock counter 68 reaches a count of 384, line 65 will remain high until a count of 384 is reached by the clock counter 68. When the latter occurs, the pulse appearing on line 80 will pass through AND gate 84 and appear as a search pulse input to the memory counter 50. However, if the clock counter 68 reaches a count of 385 before the correction pulse counter 62 reaches a count of 28', both counters will be reset and a new frame will begin.

Each time a search pulse occurs, it changes the state of the memory counter, and as stated previously, the memory counter has eight possible states. Assume for the purpose of explanation that the memory counter is initially in the 000 state, i.e., all of the Q outputs of flip flops 52 through 56 are at their low levels. Under the latter condition the channel 1 and channel 2 bits will pass through the respective mod 2 adders 86 and 88 without inversion and will be decommutated by means of decommutating flip flop 90 and the associated AND gates. The decommutating flip flop 90 is triggered by the demodulated clock pulses. During a first clock pulse the Q output of flip flop 90 will be true, the output from AND gate 98 will be true and the output from OR gate 100 will be true thereby partially energizing AND gates 108 and 104. During the clock period, the bit on channel 1 will pass through AND gate 108 and through OR gate 112 and will appear on the output parity line. The bit on channel 2 will pass through AND gate 104 and OR gate 110 and appear on the output data line. During the second and every alternate clock pulse thereafter, the $\overline{Q}$ output from flip flop 90 will be high thereby partially energizing AND gates 102 and 106 via AND gate 94 and OR gate 101. Under these conditions, the bit appearing on channel 1 will pass through AND gate 102 and OR gate 110 to the data line whereas the bit appearing on channel 2 will pass through AND gate 106 and OR gate 112 to the parity line. As is apparent from the latter description, the flip flop 90 plus AND gates 102 through 108, and OR gates 110 and 112 comprise the decommutating means which is exactly the reverse of the commutating means shown in FIG. 1. The logic comprising AND gates 92 through 98 plus OR gate 101 and 100 is not part of the decommutator but operates in response to memory stage 56 to control switching of channels 1 and 2, as will be more apparent hereafter.

Assuming, as stated earlier, that the memory is in the 000 condition, it is also now assumed that due to improper phase resolution, true data and true parity are not appearing on the proper output lines. This will cause the generation of a search pulse which will trigger flip flop 52 thereby changing memory 50 to a state corresponding to 100. The Q output from flip flop 52 will now be true or high thereby providing a true input to the mod 2 adder 86. The latter input effectively causes inversion of every data bit on channel 1. If the only error resulting from improper phase resolution is that channel 1 is inverted, the situation would now be taken care of by the 100 state of the memory. However, if there is a different error due to improper phase resolution, another search pulse will be generated thereby advancing the memory counter 50 to the 010 state. In the latter state, the Q output from flip flop 54 will be true or high thereby causing inversion of all of the bits in channel 2. A further search pulse will advance the counter to the 110 state thereby causing inversion of the bits in channels 1 and 2. A still further search pulse will advance the memory counter to the 001 state, wherein the Q output from flip flop 56 will be high. In the latter state, neither channel 1 nor channel 2 will be inverted, but instead the channel 1 and channel 2 bits will be effectively switched. As can be seen, when the Q output of flip flop 56 is high, AND gates 92 and 96 will be partially energized. The logic combination can be followed through to show that the latter condition results in an exact opposite decommutation from that described earlier. The effect of the logic is to now place the bits which were appearing on the data line onto the parity line and to place the bits which were previously appearing on the parity line onto the data line. Also, as is apparent, the generation of further search pulses advances the memory counter so that all possible combinations of channel 1 inversion, channel 2 inversion, and channel 1 and 2 switching, are tested. Since these possible combinations are the only ones which would occur due to improper phase ambiguity, one of the states of the memory will provide the necessary correction to put true data on the output data line and true parity on the output parity line. When the latter condition occurs, the probability of a further search pulse being generated is so small as to be practically impossible.

It will be noted that during the entire discussion of the synchronizer used with the rate one-half convolutional encoder and the four phase PSK modulator there was no mention of node synchronization. The reason is that for this particular case the node synchronization problem is solved as soon as the data and parity are put on the proper lines going into the threshold decoder.

Figures 4, 4A, 6, 6A:
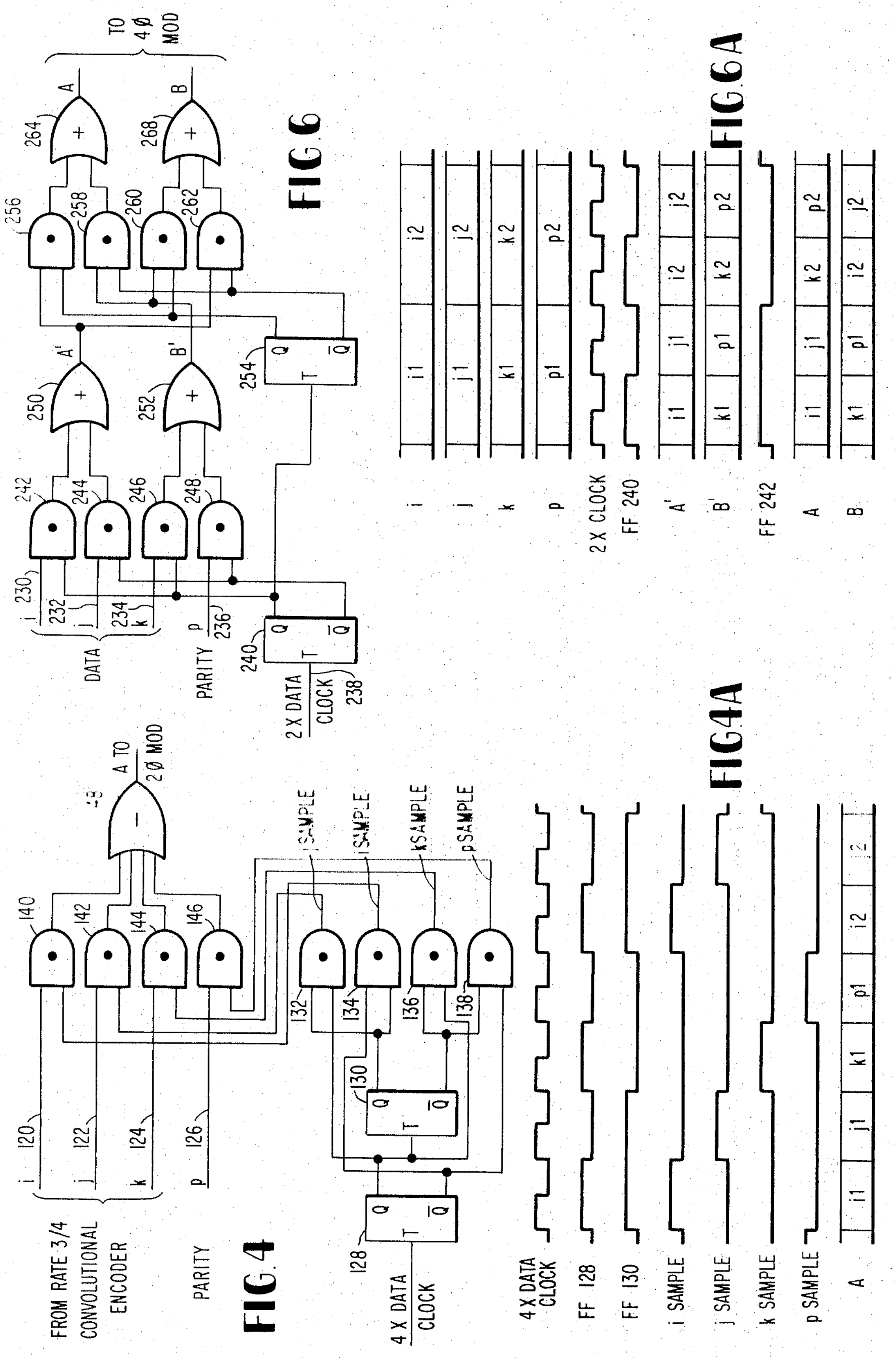
FIG. 4 is a block diagram of a portion of the transmit side of a system using a rate three-fourths convolutional encoder and a two phase PSK modulator.
FIG. 4A is a timing diagram representing the timing of various stages of the system of FIG. 4.
FIG. 6 is a block diagram of a portion of the transmit side of a system using a rate three-fourths convolutional encoder and a four phase PSK modulator.
FIG. 6A is a timing diagram representing the timing of bits at various stages of the system of FIG. 6.

An example of a system using a rate three-fourths convolutional encoder with two phase PSK modulation will now be described in connection with FIGS. 4, 4A and 5. The convolutional encoder and the threshold decoder are not shown in detail but it should be understood that these devices are conventional. Since a two phase PSK system has only one channel as compared to a four phase PSK system, the problems caused by improper phase resolution are not as severe as those in a four phase system. The only error caused by improper phase resolution is the inversion of the single channel. However, due to the use of a three-fourths convolutional encoder the node synchronization problem is greatly increased over the case where a rate one-half convolutional encoder is used. As is well known, the rate three-fourths convolutional encoder provides four parallel output bits for every three data input bits. The four parallel output bits include the original three data input bits appearing respectively on lines 120, 122, and 124, as well as a fourth bit, the parity bit, appearing on line 126. The three data bits are referred to herein as bits *i*, *j* and *k* whereas the parity bit is referred to as bit p. The remainder of the logic circuitry shown in FIG. 4 is simply a parallel to serial converter. The latter logic operates to serially arrange the parallel bits in the form illustrated in line A of FIG. 4A. During the time that the four output bits appear on lines 120 through 126, respectively, the flip flop 128 receives four data clocks. Flip flops 128 and 130 comprise a binary four counter. The first data clock during the period results in a state 11 thereby energizing AND gate 134 which in turn energizes AND gate 140 to pass the bit i through OR gate 148 to the output channel A. The second data clock during the period advances the counter to the 01 state thereby energizing AND gate 132 which in turn energizes AND gate 142 to pass the *j* bit through OR gate 148. During the third state of the counter, the *k* bit passes through OR gate 148, and during the fourth state of the counter the *p* bit passes through OR gate 148.

Figure 5:
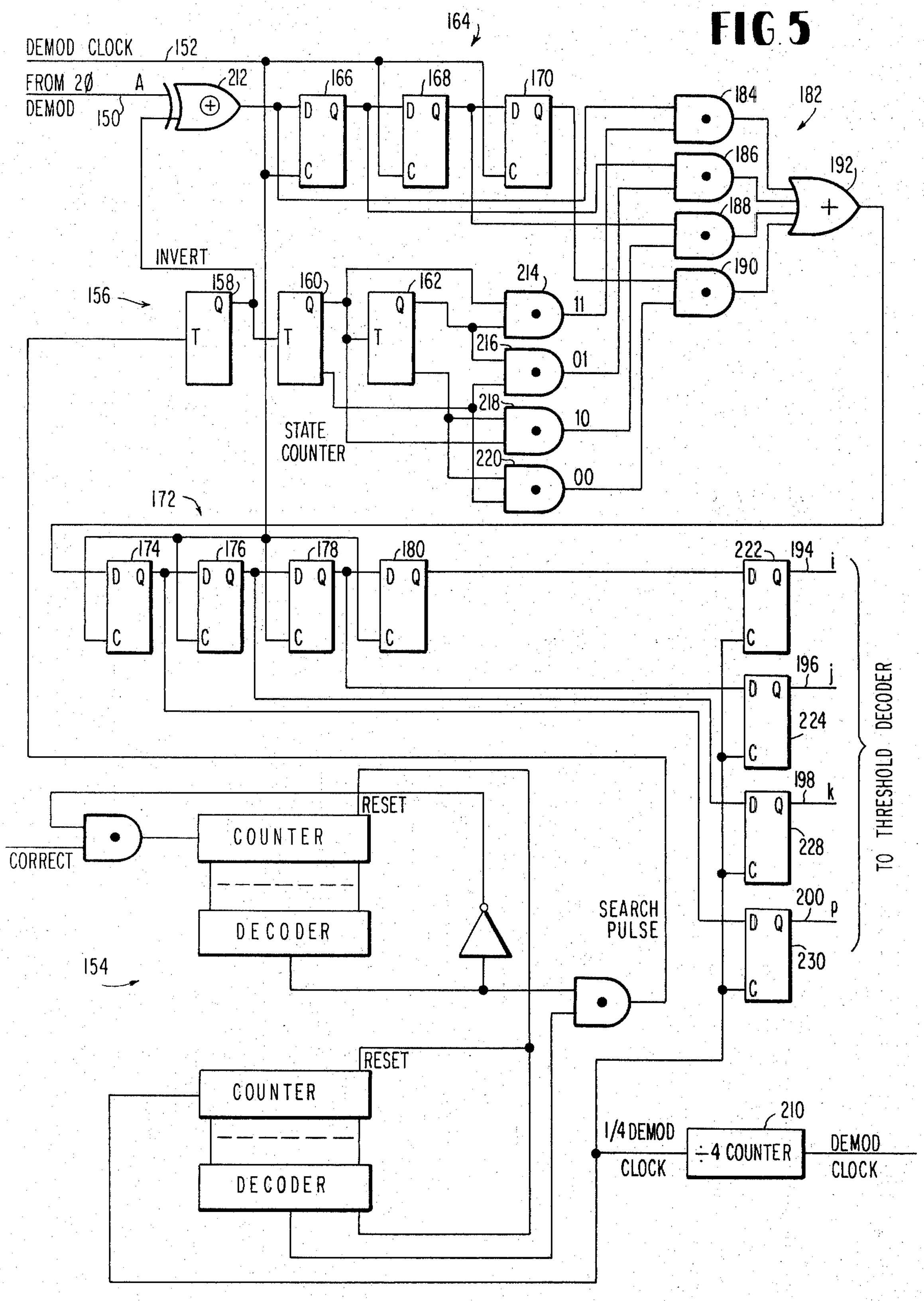
FIG. 5 is a detailed block diagram of a synchronizer for a system using a rate three-fourths convolutional encoder and a two phase PSK modulator.

Referring now to FIG. 5, which is a detailed block diagram of the synchronizer for the rate three-fourths convolutional encoder with two phase PSK modulator, the A channel output (which is the only channel output) from the two phase demodulator appears on line 150, and the demodulator clock pulses appear on line 152. The synchronizer has four output lines 194 through 200. When the system is properly synchronized, the true *i*, *j*, *k* and *p* bits will appear on the respective output lines 194 through 200. The parallel *i*, *j*, *k* bits will be applied to the data input of the threshold decoder whereas the *p* bit will be applied to the parity input of the threshold decoder. Due to the problems caused by phase ambiguity in the two phase PSK system, it is possible that the inverted *i*, *j*, *k* and *p* bits will appear on the output lines. Also, due to the problem of node synchronization it is possible that the *i*, *j*, *k* and *p* bits will not be on the proper respective output lines. For example, the *j* bit could be on line 194, the *k* bit on line 196, the *p* bit on line 198 and the *i* bit on line 194. When any of the latter incorrect conditions occurrs, the error rate detector 154 will generate a search pulse. The error rate detector 154 is essentially the same as the error rate detector 58 shown in FIG. 3 and therefore will not be described in detail herein although the logic is illustrated in detail. It is sufficient for the present purposes simply to note that the probability of a search pulse occurring when there is an output error on lines 194 through 200 is extremely high whereas the probability of a search pulse occurring when the output is correct becomes extremely low. The memory counter for the synchronizer is shown at 156 and comprises three flip flop stages 158, 160 and 162. Flip flop 158 controls inversion of the single channel whereas flip flops 160 and 162 initiate bit delays to attain node synchronization.

The channel A data on line 150 is applied through mod 2 adder 212 and is either unchanged or inverted depending upon the state of memory counter 156. The output from mod 2 adder 212 is applied to a first shift register 164 comprising stages 166, 168 and 170. The bits from mod 2 adder 212 are shifted through the shift register 164 by the demodulator clock pulses on line 152. The input to the first stage 156, and the outputs from each of the succeeding stages are applied to respective AND gates 184, 186, 188 and 190. For any given state of the memory counter 156, only a single one of the latter four AND gates is energized. Thus, for example, when AND gate 184 is energized, the output from the mod 2 adder will pass through OR gate 192 without any delay. When AND gate 186 is energized the output from the mod 2 adder will pass through OR gate 192 with a single bit delay. When AND gate 188 is energized the output from mod 2 adder 212 will pass through OR gate 192 with a two bit delay. When AND gate 190 is energized, the output from mod 2 adder will pass through OR gate 192 with a three bit delay. As can be seen from the logic circuitry connected to stages 160 and 162 of the memory counter 156, any change in flip flop 160 and 162 will cause a different one of the AND gates 184 through 190 to be energized, thereby causing a shift in the bit stream. The output from OR gate 192 which constitutes the channel A stream, is applied to a second shift register 172 comprising stages 174, 176, 178 and 180. The second shift register 172, in combination with registers 222 through 228 comprise a serial to parallel converter.

Assume, for the purpose of understanding the operation of the synchronizer shown in FIG. 5, that the memory counter 156 is in the 011 state, i.e., flip flops 160 and 162 are both in the 1 state. Under this condition, since the Q output from flip flop 158 is low, the channel A bits will pass through mod 2 adder 212 without inversion. Since the Q outputs from flip flops 160 and 162 are high, AND gate 214 will be energized and thus AND gate 184 will be partially energized. AND gates 186 through 190 will be deenergized. Thus, the output from mod 2 adder 212 will pass through AND gate 184 and OR gate 192 without any delays. The demodulated clock will be applied to a divide by four counter 210 whose output in turn is applied to the clock input of the registers 222 through 230. Upon the occurrence of the output from the divide by four counter 210, the contents of shift register 172 will be shifted in parallel into the respective registers 222 through 230.

Assume for the purpose of explanation that when the synchronizer is in the state just described, the output bits will be inverted and the sequence of the bits on lines 194 through 200 will be as follows: $\bar{k}$ will appear on 194, $\bar{p}$ will appear on 196, $\bar{i}$ will appear on 198, and $\bar{j}$ will appear on 200. Because of this incorrect arrangement of the data and parity, the threshold decoder will generate a relatively large number of correction pulses causing the error rate detector 154 to generate a search pulse. The first search pulse will advance the memory counter to the count of 101, i.e., flip flops 158 and 162 will be in the one state whereas flip flop 160 will be in the zero state. Since the flip flop 158 is in the one state, the bits on input line 150 will be inverted in the mod 2 adder 212. The condition of flip flops 160 and 162 will cause AND gate 186 to be partially energized, thereby inserting a one bit delay into the bit stream. The result will be that the true $p$ bit will appear on line 194, the true $i$ bit will appear on line 196, the true $j$ bit will appear on line 198 and the true $k$ bit will appear on line 200. Since this condition is still not the correct condition, the error rate detector 154 will generate another search pulse changing the state of the memory counter 156 to the state 001. In the 001 state, the mod 2 adder 212 will not invert the bits on line 150. The AND gate 186 will still be partially energized as in the prior state, and the result will be that the $\bar{p}$ will appear on line 194, $\bar{i}$ will appear on line 196, $\bar{j}$ will appear on line 198, and $\bar{k}$ will appear on line 200. This condition, like the two prior conditions, is not the correct one and a further search pulse will be generated. The next search pulse will cause the memory counter 156 to reach the state of 110. In the latter condition, flip flop 158 will be high and thereby cause inversion in the mod 2 adder 212. Furthermore, AND gate 188 will be partially energized thereby inserting an additional bit delay into the bit stream. The inversion plus the additional bit delay will result in $i$ appearing on line 194, $j$ appearing on line 196, $k$ appearing on line 198 and $p$ appearing on line 200. The latter is the correct condition and, as previously described, the probability of a search pulse occurring when the correct data and parity are applied to the threshold decoder is extremely low. A summary of the above described states of the memory counter with the resultant arrangement of $i$ through $p$ bits on the output lines is illustrated in Table I below. However, it should be remembered that the initial conditions of the output bits for state 011 was merely an assumption. Nontheless, whatever assumption is made for the output state it can be seen that the memory counter will eventually reach a state which will cause the $i, j, k$ and $p$ bits to appear in true form on the proper output lines.

TABLE I

| Memory States | Output Lines 194 | 196 | 198 | 200 |
|---|---|---|---|---|
| 011 | $\bar{k}$ | $\bar{p}$ | $\bar{i}$ | $\bar{j}$ |
| 101 | $p$ | $i$ | $j$ | $k$ |
| 001 | $\bar{p}$ | $\bar{i}$ | $\bar{j}$ | $k$ |
| 110 | $i$ | $j$ | $k$ | $p$ |

The third example to be described solves the phase ambiguity problem and the node synchronization problem for a system which uses a rate three-fourths convolutional encoder with four phase PSK modulation. For this case, since there are two data channels, the phase ambiguity problem can result in eight possible conditions of the data on the received A and B channels. Also, in this case, similar to the first case described, commutation of the data on the two channels is necessary to prevent the threshold decoder from receiving inverted data and true parity. As will be recalled, the latter situation would not be detected by the threshold decoder and thus commutation is important to prevent inverted data and true parity from occurring.

FIG. 6 shows the logic on the transmit side of the system which is connected between the output of the rate three-fourths convolutional encoder and the two channel input to the conventional four phase PSK modulator. FIG. 6A shows the bit arrangement at various points in the logic circuit of FIG. 6. As described previously, for each three data bits, $i$, $j$, and $k$ into the rate three-fourths convolutional encoder, the latter device provides four output bits including the $i$, $j$, $k$ data bits as well as the $p$ parity bit. The latter bits appear respectively on lines 230 through 236. A flip flop 240 receives clock pulses on line 238 occurring at twice the data clock rate. The flip flop 240 in combination with AND gates 242 through 248 and OR gates 250 through 252 convert the bits on the four input lines into two parallel channels of serially arranged bits on the A′ and B′ lines. For example, during the period corresponding to four data clocks when the $i$, $j$, $k$ and $p$ bits appear on the respective lines 230 through 236, the flip flop 240 will receive two clock inputs. During the first clock input the Q output of flip flop 240 will be high causing the $i$ bit to appear on the A′ line and the $k$ bit to appear on the B′ line. The second clock pulse will cause $\bar{Q}$ of flip flop 240 to be high thereby transferring the $j$ bit to the A′ line and the $p$ bit to the B′ line. The arrangement of data bits on the A′ and B′ lines is illustrated in FIG. 6A. As can be seen, the A′ line includes the $i$ and $j$ bits serially arranged whereas the B′ line includes the $k$ and $p$ bits serially arranged.

Flip flop 254 in combination with AND gates 256 through 262 and OR gates 264 and 268 operate to commutate the bits on the A′ and B′ lines so that effectively for two bit periods the A′ line is connected to the A line and the B′ line is connected to the B line and then for the next two bit periods the A′ line is connected to the B line and the B′ line is connected to the A line. The resulting arrangement of the bits on the A and B channels are also illustrated in FIG. 6A. Since the trigger input to flip flop 254 is connected to the Q output of flip flop 240, flip flop 254 will be triggered once every four data clocks. When $\bar{Q}$ of flip flop 254 is high, the A′ line will be connected to the A output line via AND gate 256 and OR gate 264, and the B′ line will be connected to the B line via AND gate 260 and OR gate 268. When Q of flip flop 254 is high, the A′ line will be connected to the B line via AND gate 262 and OR gate 268, and the B′ line will be connected to the A line via AND gate 258 and OR gate 264. The bit sequence on the A line, as shown in FIG. 6A, will thus be $i_1$, $j_1$, $k_2$, $p_2$, $i_3$, $j_3$, etc., whereas the output bit arrangement on the B line will be $k_1$, $p_1$, $i_2$, $j_2$, $k_3$, $p_3$, etc.

Figures 7, 7A:
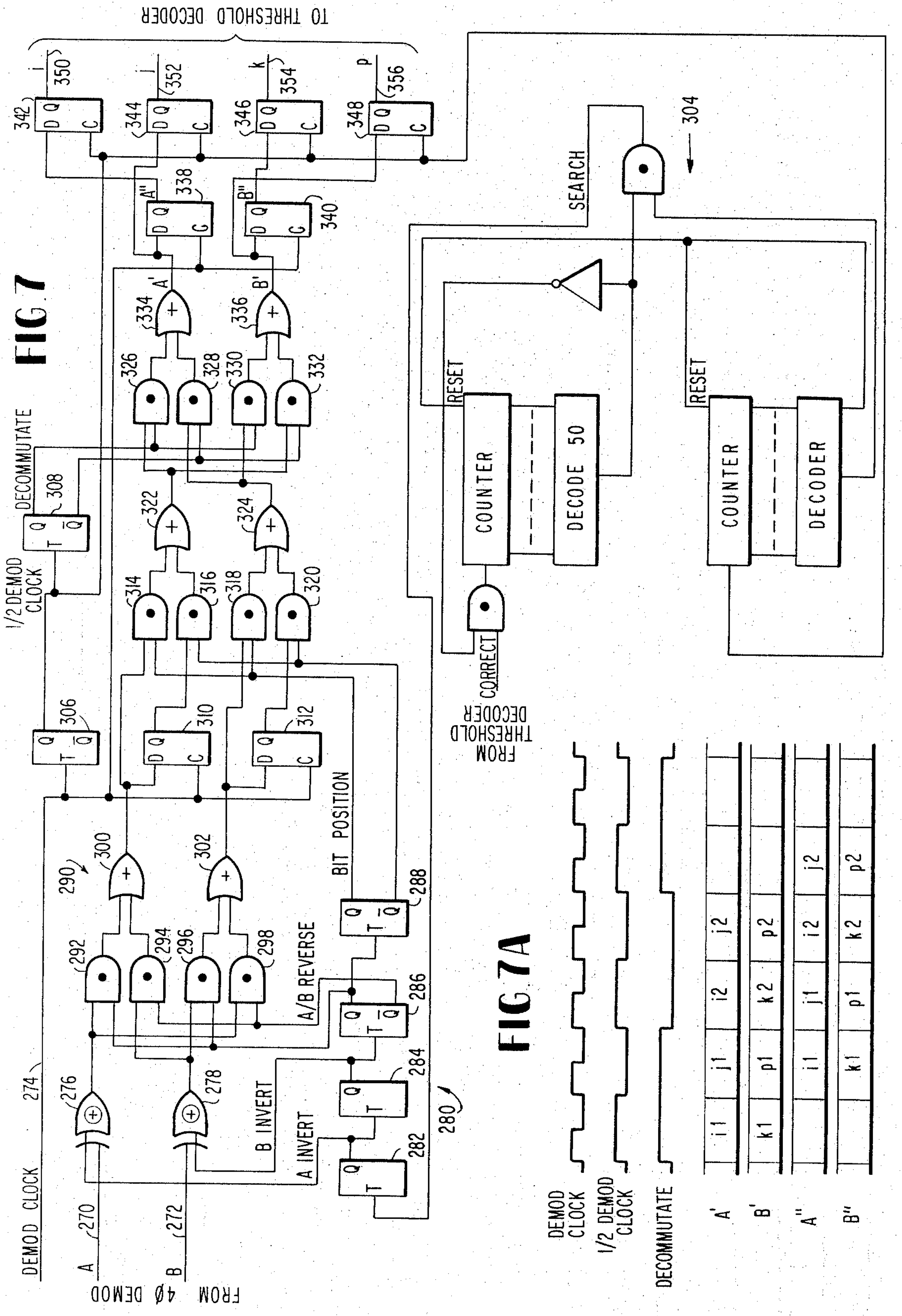
FIG. 7 is a detailed block diagram of a synchronizer for a system using a rate three-fourths convolutional encoder and a four phase PSK modulator.
FIG. 7A is a timing diagram representing the timing of bits at various stages of the system of FIG. 7.

A detailed block diagram of the synchronizer on the receive side of the system is illustrated in FIG. 7. The output A and B channels from the four phase PSK demodulator are shown at 270 and 272. The demodulated clock pulses appear at 274. This synchronizer also includes an error rate detector 304 which receives correction pulses from the threshold decoder and which is similar to the error rate detectors of the synchronizers shown in FIGS. 3 and 5. The latter device generates a search pulse whenever the error rate indicates the improper arrangement of data and parity bits going into the threshold decoder. A memory counter 280 is provided comprising four flip flop stages 282, 284, 286 and 288. The first three stages, respectively, control inversion of the A channel, inversion of the B channel, and switching of the A and B channel. The fourth stage controls a single bit delay which may be needed to achieve proper node synchronization. Unlike the case of the rate three-fourths convolutional encoder with two phase PSK demodulation, the present case only needs a one bit delay arrangement. Due to the two channels of data the node synchronization can only be off by one bit whereas in the previously described case, the node synchronization could be off by as much as three bits.

The A channel passes through mod 2 adder 276 and may or may not be inverted depending upon the state of flip flop 282. The B channel passes through mod 2 adder 278 and may or may not be inverted depending upon the state of flip flop 284. The outputs from mod 2 adders 276 and 278 are applied in parallel to logic circuitry 290 which responds to the state of flip flop 286. When flip flop 286 is in one state, the A and B channel data will pass therethrough without any switching. When flip flop 286 is in the opposite state, the bits on the A and B channels will be switched or reversed. Thus, when flip flop 286 is in the one state, Q will be high thereby partially energizing AND gates 292 and 296. When this occurs, the A channel bits from the mod 2 adder 276 will pass directly to the output of OR gate 300 and the B channel bits from mod 2 adder 278 will pass directly to the output of OR gate 302. When flip flop 286 is in the zero state, $\overline{Q}$ will be high thereby partially energizing AND gates 294 and 298. Under this condition, the A channel bits from mod 2 adder 276 will pass to the output of OR gate 302 and the B channel bits from mod 2 adder 278 will pass to the output of OR gate 300.

The bits appearing at the outputs of OR gates 300 and 302 are applied to the respective one bit registers 310 and 312. The latter registers are controlled by the demodulated clock pulses on line 274. The output bits from OR gates 300 and 302 are also applied directly to respective AND gates 314 and 318. The outputs from registers 310 and 312 are applied to respective AND gates 316 and 320. The latter registers and the AND gates 314 through 320 respond to the state of flip flop 288 to either pass the A and B channels directly to the outputs of OR gates 322 and 324 or to delay the A and B channels by a single bit time and pass those delayed channel bits out to OR gates 322 and 324. For example, when flip flop 288 is in the one state, Q will be high thereby partially energizing AND gates 314 and 318 and deenergizing AND gates 316 and 320. When in this condition, the output bits from OR gate 300 will pass directly to the output of OR gate 322 and the output bits from 302 will pass directly to the output of OR gate 324. When flip flop 288 is in the zero state, $\overline{Q}$ will be high thereby partially energizing AND gates 316 and 320, and deenergizing AND gates 314 and 318. In this condition, the output bits from OR gate 300 will be delayed by one bit in register 310 and will then be passed to the output 322. The output bits from OR gate 302 will be delayed by one bit time in register 312 and will then be applied to the output of OR gate 324.

The output bits appearing at the outputs of OR gates 322 and 324 are decommutated by the logic which includes decommutating flip flop 308, AND gates 326 through 332 and OR gates 334 and 336. The demodulated clock pulses on line 274 are applied to a flip flop 306 whose output corresponds to one-half the demodulated clock pulse rate. The latter pulses trigger the decommutating flip flop 308 which controls the remainder of the decommutating logic. When Q of flip flop 308 is high, the data bits at the output of OR gate 322 appear on the A′ line at the output of OR gate 334, and the data bits at the output of OR gate 324 appear on the B′ line at the output of OR gate 336. When $\overline{Q}$ of flip flop 308 is high, the connections between the outputs of OR gates 322 and 324 on the one hand and the A′ and B′ lines on the other hand are reversed, thus achieving the necessary decommutation.

Assuming this system is properly synchronized, the arrangement of bits on the A′ and B′ lines will be the same as that illustrated in FIG. 7A. The A′ and B′ lines are connected respectively to one bit storage registers 338 and 340 which operate as serial to parallel converters. The output of register 338 is connected to the input of register 342 and the input line of register 338 is connected to the input of register 344. The output of register 340 is connected to the input of register 348 and the input line of register 340 is connected to the input line of register 346. If the system is properly synchronized, the *i*, *j*, *k* and *p* bits will appear in true form on the respective output lines 350 through 356. It is noted that the bits on the A′, A″, B′ and B″ lines are gated into the respective registers 342 through 348 in response to the one-half demodulated clock pulses appearing at the output of flip flop 306.

For the purpose of understanding the node synchronization problem and its solution in this particular case, it will be assumed that the input lines 270 and 272 from the four phase PSK demodulator contain the correct A channel and B channel bits, i.e., no inversion and no channel reversal. Accepting that condition, the only error in the output is the error which can be caused by improper node synchronization. That error would cause the *j* bit to appear on line 350 and the *i* bit to appear on line 352. It would also cause the *p* bit to appear on line 354 and the *k* bit to appear on line 356. The latter described condition will occur if the clock output from flip flop 306 occurs at the time when the input bit to register 338 is the *i* bit and the output bit from the register 338 is the *j* bit. It will also be noted that at the same time the input bit to register 340 will be the *k* bit and the output bit from register 340 will be the *p* bit. As will be apparent, this node synchronization problem can be solved simply by adding a one bit delay into each of the channels, and this is accomplished by effectively inserting the registers 310 and 312 into the A and B channels in the manner previously described. If the one bit delay is inserted, the timing relationship between the bits appearing at the inputs and outputs of registers 338 and 340 and the output clock pulses from flip flop 306 will change by one bit position. This one bit change will cause registers 342 through 348 to be clocked when the *i* bit is on the line A″, the *j* bit is on the line A′, the *k* bit is on the line B″, and the *p* bit is on line B′.

The memory counter 280, having four stages, has 16 different states from 0000 to 1111. No matter what combination of inversion, reversal, and node sync errors exists, one of the 16 states of the memory counter will provide the correct combination of corrections to resolve the phase ambiguity and the node synchronization problem. As a simple example, assume that the counter is in the 0000 state and all combinations of error exists. In other words, both the A and B channels on lines 270 and 272 are inverted and reversed and also the node synchronization is erroneous. This resulting combination of errors will cause the following arrangement of output bits on lines 350 through 356: $\bar{p}$ will appear on line 350, $\bar{k}$ will appear on line 352, $\bar{j}$ will appear on line 354 and $\bar{i}$ will appear on line 356. This condition will result in the generation of a search pulse which will advance the counter 280 to the state of 1111. When in the latter state, the A channel will be inverted, the B channel will be inverted, the A and the B channels will be switched, and an additional bit delay will be inserted into the channel lines. The result will be the true *i* bit appearing on line 350, the true *j* bit appearing on line 352, the true *k* bit appearing on line 354 and the true *p* bit appearing on line 356. Although the latter example starts with a simple assumption which needs only one search pulse to make all the corrections, any group of errors can be assumed for any given state of the counter and the results will be the same. That is, search pulses will continue to be generated until the counter reaches a state which causes the proper combination of corrections to reach the proper result.

While the invention has been described specifically in terms of rate one-half and rate three-fourths convolutional encoding and two phase and four phase PSK modulation systems, it should be apparent that the invention has applicability with other rate convolutional encoders and other multiple phase PSK modulation systems.

What is claimed is:

1. In a digital communications system of the type having a convolutional encoder at the transmit side and a corresponding threshold decoder at the receive side, and further having a PSK modulator at the transmit side and a corresponding PSK demodulator on the receive side, the improvement comprising a synchronizer connected between the output of said PSK demodulator and the input of said threshold decoder and responsive to the error indicating bit outputs from said threshold decoder for resolving phase ambiguity caused by an incorrect reference phase in said PSK demodulator and for insuring proper separation and arrangements of the data and parity bits at the output of said synchronizer.

2. The invention as claimed in claim 1 wherein said synchronizer comprises, a. X separate logic means, adapted when activated, to perform X respective correction operations on the input bits to said synchronizer, each said correction operation correcting one error of the type which can be caused by phase ambiguity or improper node synchronization, b. a memory counter having n stages, each of said stages being individually connected to said X logic means, respectively, to control activation of said logic means, and c. error rate detection means responsive to said error indicating bits for advancing the count of said memory counter whenever rate of occurrance of said error indicating bits is above a predetermined rate.

3. The invention as claimed in claim 1 wherein said synchronizer comprises, a. logic means for correcting each type of error caused by phase ambiguity and incorrect node synchronization for the particular rate convolutional encoder and PSK modulator - demodulator used, b. a memory counter having at least $y^2$ states, where $y^2-1$ equals the number of possible combinations of said types of errors, each state of said memory counter activating said logic means to correct a different combination of said types of errors, respectively, and c. error rate detection means responsive to said error indicating bits for advancing the state of said memory counter whenever the rate of occurrance of said error indicating bits is above a predetermined rate.

4. The invention as claimed in claim 3 wherein said communication system includes a two phase PSK modulator - demodulator, and wherein said logic means in said synchronizer comprises, a. means, when activated, for inverting the input bit stream applied to said synchronizer, and b. a number of bit delay means, equal in number to the possible node synchronization errors, for individually delaying the bit stream between the input and output of said synchronizer.

5. The invention as claimed in claim 4 wherein said memory counter comprises, a. a first stage having two states, one of which activates said inverting means, and b. a number of second stages, having a total number of states equal to one plus the number of bit delay means, each said state selectively causing insertion of none or any number of said bit delay means between the input and output of said synchronizer.

6. The invention as claimed in claim 4 wherein said convolutional encoder is a rate three-fourths convolutional encoder, and wherein the number of bit delay means is three and the number of second stages of the memory counter is two.

7. The invention as claimed in claim 3 wherein said communications system includes a four phase PSK modulator - demodulator and the demodulator output includes two channels of bit streams applied to said synchronizer, the logic means of said synchronizer comprising, a. first means, when activated, for inverting the bits on said first channel, b. second means, when activated, for inverting the bits on said second channel, and c. third means, when activated, for switching the bits on said first and second channels.

8. The invention as claimed in claim 7 wherein said memory counter comprises, a. a first stage, having two states, one of which activates said first means, b. a second stage, having two states, one of which activates said second means, and c. a third stage, having two states, one of which activates said third means.

9. The invention as claimed in claim 7 further comprising, a. means at said transmit side located between the output of said convolutional encoder and the input of said four phase PSK modulator for commutating two channels of bit streams going into said modulator, and b. means in said synchronizer located between the input and output thereof for decommutating the two channels of bits streams coming out of the PSK demodulator.

10. The invention as claimed in claim 8 wherein the encoder is a rate three-fourths convolutional encoder, and wherein said logic means further comprises, a. a single bit delay means adapted, when activated, to impart a single bit delay to both channels of bit streams passing through said synchronizer.

11. The invention as claimed in claim 10 wherein said memory counter further comprises, a. a fourth stage, having two states, one of which activates said single bit delay means.

12. The invention as claimed in claim 11 further comprising, a. means at said transmit side located between the output of said convolutional encoder and the input of said four phase PSK modulator for commutating two channels of bit streams going into said modulator, and b. means in said synchronizer located between the input and output thereof for decommutating the two channels of bit streams coming out of the PSK demodulator.

* * * * *

UNITED STATES PATENT OFFICE
CERTIFICATE OF CORRECTION

Patent No. 3,806,647 Dated April 23, 1974

Inventor(s) Alan Swaine Dohne et al

It is certified that error appears in the above-identified patent and that said Letters Patent are hereby corrected as shown below:

In The Specification:

Column 7, line 46 - delete "28' " and insert -- 28 --

Column 9, line 44 - delete "modulator" and insert -- modulation --

Column 10, line 37 - after "gate 192" insert --, --

Column 12, line 43 - delete "$\overline{Q}$" and insert -- Q --
line 48 - delete "Q" and insert -- $\overline{Q}$ --

Column 16, line 67 - delete "bits" and insert -- bit --

Signed and sealed this 17th day of September 1974.

(SEAL)
Attest:

McCOY M. GIBSON JR.
Attesting Officer

C. MARSHALL DANN
Commissioner of Patents